US012662622B1

(12) United States Patent
Alsmaeil

(10) Patent No.: US 12,662,622 B1
(45) Date of Patent: Jun. 23, 2026

(54) LONG TERM STABILITY OF MESOPOROUS NANO-CAPSULES OF CATIONIC SURFACTANT AT HIGH TEMPERATURE AND SALINITY CONDITIONS

(71) Applicant: SAUDI ARABIAN OIL COMPANY, Dhahran (SA)

(72) Inventor: Ahmed Wasel Alsmaeil, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 19/313,193

(22) Filed: Aug. 28, 2025

(51) Int. Cl.
*C09K 8/584* (2006.01)

(52) U.S. Cl.
CPC ..................................... *C09K 8/584* (2013.01)

(58) Field of Classification Search
CPC ....................................................... C09K 8/584
See application file for complete search history.

(56) References Cited

U.S. PATENT DOCUMENTS

| | | | | |
|---|---|---|---|---|
| 2003/0131999 | A1* | 7/2003 | Nguyen ................. | C09K 8/805 507/924 |
| 2016/0333259 | A1* | 11/2016 | Monastiriotis ......... | C09K 8/805 |
| 2017/0252446 | A1 | 9/2017 | Voigt et al. | |
| 2019/0169487 | A1 | 6/2019 | Barati | |
| 2020/0369946 | A1 | 11/2020 | Gizzatov et al. | |
| 2020/0369949 | A1 | 11/2020 | Gizzatov et al. | |

(Continued)

FOREIGN PATENT DOCUMENTS

| | | |
|---|---|---|
| CN | 1769174 A | 5/2006 |
| CN | 108217662 A | 6/2018 |

(Continued)

OTHER PUBLICATIONS

Lee, Joohyung et al., "Behavior of Spherical Poly(2-acrylamido-2-methylpropanesulfonate) Polyelectrolyte Brushes on Silica Nanoparticles up to Extreme Salinity with Weak Divalent Cation Binding at Ambient and High Temperature"; Macromolecules; vol. 50, Issue 19; pp. 7699-7711; Oct. 10, 2017 (13 pages).

(Continued)

*Primary Examiner* — Crystal J Lee

(74) *Attorney, Agent, or Firm* — Osha Bergman Watanabe & Burton LLP

(57) ABSTRACT

A method for stabilizing mesoporous materials includes providing a suspension including a mesoporous particle, wherein the mesoporous particle includes an encapsulated surfactant; contacting the suspension with a solution including ring-opened GLYMO at a temperature ranging from 40 to 80° C. and at a pH ranging from 8 to 11 to form a surface modified mesoporous particle, and contacting the surface modified mesoporous particle with a zwitterionic surfactant solution to form a stabilized mesoporous material. A wellbore fluid composition includes an aqueous base fluid and the mesoporous materials. A method for treating a hydrocarbon-bearing formation includes introducing into a hydrocarbon-bearing formation a wellbore fluid composition including an aqueous base fluid and mesoporous materials, displacing hydrocarbons from the formation by contacting the hydrocarbons with the wellbore fluid composition, and recovering the hydrocarbons.

20 Claims, 7 Drawing Sheets

(56) References Cited

U.S. PATENT DOCUMENTS

| | | |
|---|---|---|
| 2022/0403227 A1 | 12/2022 | Abdel-Fattah et al. |
| 2024/0141223 A1 | 5/2024 | Alqahtani et al. |

FOREIGN PATENT DOCUMENTS

| | | | | |
|---|---|---|---|---|
| CN | 114988415 A | 9/2022 | | |
| CN | 116870189 A | 10/2023 | | |
| RU | 2287485 C1 | 11/2006 | | |
| WO | WO-2017136641 A1 * | 8/2017 | .......... | C09K 11/025 |
| WO | 2022036359 A1 | 2/2022 | | |
| WO | 2024097692 A1 | 5/2024 | | |

OTHER PUBLICATIONS

Abdel-Fattah, Amr I. et al., "NanoSurfactant for EOR in Carbonate Reservoirs"; Proceedings of the SPE Kingdom of Saudi Arabia Annual Technical Symposium and Exhibition; Paper No. SPE-188046-MS; pp. 1-8; Apr. 24, 2017 (8 pages).

Gizzatov, Ayrat et al., "Nanofluid of Petroleum Sulfonate Nanocapsules for Enhanced Oil Recovery in High-Temperature and High-Salinity Reservoirs"; Energy & Fuels; vol. 33, Issue 11; pp. 11567-11573; Nov. 21, 2019 (7 pages).

Chen, Hsieh et al., "Molecular Assembly of Surfactant Mixtures in Oil-Swollen Micelles: Implications for High Salinity Colloidal Stability"; The Journal of Physical Chemistry B; vol. 124, Issue 3; Jan. 23, 2020 (9 pages).

Alsmaeil, Ahmed et al., "Slow Release of Surfactant Using Silica Nanosized Capsules"; SPE Journal; vol. 25, Issue 06, Paper No. SPE-202479-PA; pp. 3472-3480; Dec. 2020 (9 pages).

Datt, Ashish et al., "Aspirin Loading and Release from MCM-41 Functionalized with Aminopropyl Groups via Co-condensation or Postsynthsis Modification Methods"; The Journal of Physical Chemistry C; vol. 116, Issue 34; pp. 18358-18366; Aug. 30, 2012 (9 pages).

Goworek, J. et al., "Thermal Degradation of CTAB in As-Synthesized MCM-41"; Journal of Thermal Analysis and Calorimetry; vol. 96, Issue 2; pp. 375-382; May 2009 (8 pages).

Worthen, Andrew J. et al., "Steric stabilization of nanoparticles with grafted low molecular weight ligands in highly concentrated brines including divalent ions"; Soft Matter; vol. 12, Issue 7; pp. 2025-2039; Feb. 2016 (15 pages).

He, Rong et al., Design and fabrication of highly ordered ion imprinted SBA-15 and MCM-41 mesoporous organosilicas for efficient removal of Ni2+ from different properties of wastewaters; Microporous and Mesoporous Materials; vol. 257; pp. 212-221; Feb. 2018 (10 pages).

Alsmaeil, Ahmed Wasel et al., "Encapsulation of an Anionic Surfactant into Hollow Spherical Nanosized Capsules: Size Control, Slow Release, and Potential Use for Enhanced Oil Recovery Applications and Environmental Remediation"; ASC Omega; vol. 6, Issue 8; pp. 5689-5697; Mar. 2, 2021 (9 pages).

Alsadeg, Hala et al., "Responsive and Controlled Release of Surfactant Encapsulated in Amino Functionalized Mesoporous Silica Nanoparticles"; Proceedings of the SPE Annual Technical Conference and Exhibition; Paper No. SPE-210168-MS; pp. 1-8; Sep. 26, 2022 (8 pages).

Alsmaeil, Ahmed Wasel et al., "From Biomedical to Oil Industry: Promising Mesoporous Materials for Oil Field Applications"; Proceedings of the SPE Europec featured at 82nd EAGE Conference and Exhibition; Paper No. SPE-205175-MS; pp. 1-11; Oct. 18, 2021 (11 pages).

* cited by examiner

FIG. 1

High temperature stability t= 0        20 min        1 day        2 days        3 days        11 days

LONG TERM STABILITY OF MESOPOROUS NANO-CAPSULES OF CATIONIC SURFACTANT AT HIGH TEMPERATURE AND SALINITY CONDITIONS

BACKGROUND

Utilizing nanosized materials for subsurface applications, such as improving foam stability to enhancing oil/gas recovery, enhancing geothermal energy extraction and delivery active materials for subsurface sensing, is limited by the poor colloidal stability at the conditions encountered in subsurface environment, such as high salinity conditions and extreme temperatures. Accordingly, there exists a need for stabilized nanosized capsules suitable for use in high temperature and salinity conditions.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method for stabilizing mesoporous materials including providing a suspension including a mesoporous particle, wherein the mesoporous particle includes an encapsulated surfactant; contacting the suspension with a solution including ring-opened GLYMO at a temperature ranging from 40 to 80° C. and at a pH ranging from 8 to 11 to form a surface modified mesoporous particle, and contacting the surface modified mesoporous particle with a zwitterionic surfactant solution to form a stabilized mesoporous material.

In another aspect, embodiments disclosed herein relate to a wellbore fluid composition including an aqueous base fluid, and mesoporous materials including an encapsulated surfactant and 3-(glycidyloxypropyl)trimethoxysilane (GLYMO) as a surface functionality; wherein the mesoporous materials are formed by treating the mesoporous materials with a zwitterionic surfactant.

In yet another aspect, embodiments disclosed herein related to a method for treating a hydrocarbon-bearing formation including introducing into a hydrocarbon-bearing formation a wellbore fluid composition including an aqueous base fluid and mesoporous materials, wherein the mesoporous materials include an encapsulated cationic surfactant and 3-(glycidyloxypropyl)trimethoxysilane (GLYMO) as a surface functionality, displacing a hydrocarbons from the hydrocarbon-bearing formation by contacting the hydrocarbons with the wellbore fluid composition, and recovering the hydrocarbons from the hydrocarbon-bearing formation, wherein the mesoporous materials are formed by treating the mesoporous materials with a zwitterionic surfactant.

Other aspects and advantages of the claimed subject matter will be apparent from the following description and the appended claims.

BRIEF DESCRIPTION OF DRAWINGS

FIG. 1 is a reaction scheme according to Example 1.

DETAILED DESCRIPTION

Figure 2:
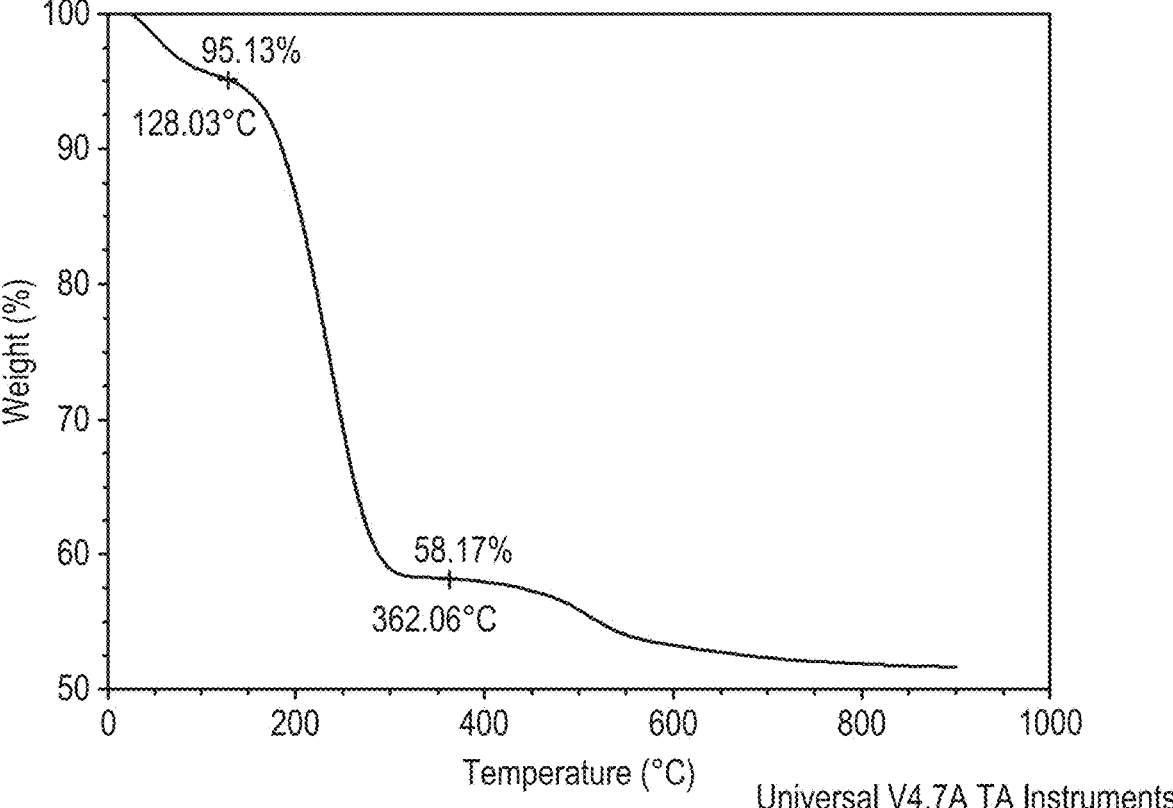
FIG. 2 is thermogravimetric analysis (TGA) spectrum according to Example 1.

The methods disclosed herein address surfactant molecule adsorption and losses near the injection area and nanomaterial instability at high salinity conditions. This need is addressed by encapsulating surfactant molecules inside porous particles. The particles are then made colloidally stable with surface functionalization. The stabilized particles may then be used for applications that require release of surfactants in response to ions in oilfield water or colloidal stable nanoparticles for enhanced recovery of valuable subsurface materials.

Embodiments in accordance with the present disclosure generally relate to a mesoporous particles that feature an encapsulated surfactant and a surface modified with 3-glycidyloxypropyl)trimethoxysilane (GLYMO). The surface modified mesoporous particles may be further treated with a zwitterionic surfactant to provide stabilized mesoporous particles which are suitable for use under harsh reservoir conditions, such as high temperature and high salinity. A method of making and using mesoporous particle compositions in enhanced oil recovery (EOR) applications are also described.

Method of Forming Stabilized Mesoporous Silica Nanoparticles (MSNs)

In one aspect, embodiments of the present disclosure relate to a method for stabilizing mesoporous particles, the method including providing a suspension comprising a mesoporous particle, wherein the mesoporous particle comprises an encapsulated surfactant, contacting the suspension with a solution that includes ring-opened GLYMO at a temperature ranging from 40 to 80° C. and at a pH ranging from 8 to 11 to form a surface modified mesoporous particle, and contacting the surface modified mesoporous particle with a zwitterionic surfactant solution to form a stabilized mesoporous material.

The MSNs may encapsulate a surfactant, such as a cationic or anionic surfactant. According to one or more embodiments, the MSN may include cationic surfactants including but not limited to cetyltrimethylammonium bromide, cetyltrimethylammonium chloride, octadecyltrimethylammonium chloride, hexadecylpyridinium bromide, didodecyldimethylammonium bromide, dioctadecyldimethylammonium bromide, N,N-dimethyl-N-octadecyl-N-benzylammonium chloride. The MSN may include anionic surfactants including but not limited to sodium dodecyl sulfate, sodium lauryl sulfate, or dioctyl sulfosuccinate sodium as the encapsulated surfactant.

The MSNs may also have a surface functionalization. In one or more embodiments, the MSNs may be surface functionalized with a ring-opened glycidyl ether, such as (3-Glycidyloxypropyl)trimethoxysilane (GLYMO).

As will be appreciated by one of ordinary skill in the art, MSNs are silica-based particles that have pores. As used herein "pores" refer to void spaces in the particle. In one or more embodiments, the MSNs have pores having an average diameter of from about 2 to 50 nm (nanometers). In some embodiments, the pores may be in the shape of extended cylinders.

In one or more embodiments, MSNs have a suitable organic content, as determined by thermal gravimetric analysis (TGA). As the primary component of the MSNs, silica, is inorganic, the organic content of the MSNs may indicate the amount of encapsulated surfactant present and thus indicate if the surfactant is completely encapsulated by the MSNs. An organic content indicating complete encapsulation of the surfactant inside the pores may range from about 30 to 50 wt %, based on the total weight of the MSNs. For example, MSNs that fully encapsulate a surfactant may have an organic content ranging from a lower limit of one of 30, 32, 34, 36, 38, and 40 wt %, to an upper limit of one of 40, 42, 44, 46, 48, and 50 wt %, where any lower limit may be paired with any mathematically compatible upper limit. In particular embodiments, MSNs have an organic content of about 40 wt %, based on the total weight of the MSNs.

In one or more embodiments, the MSNs have a suitable size prior to stabilization with a surface functionalization. The MSNs prior to stabilization may have an average diameter ranging from about 50 to 500 nm. For example, MSNs may have an average particle size/diameter ranging from a lower limit of one of 50 nm, 75 nm, 100 nm or 150 nm to an upper limit of one of 200 nm, 250 nm, 300 nm, 350 nm, 400 nm or 500 nm, where any lower limit may be paired with any mathematically compatible upper limit.

The MSNs may be provided from a commercially available source or may be synthesized according to known methods. The commercially available or synthesized MSNs may therefore be free of the encapsulated surfactant or include the encapsulated surfactant within the pores of the MSN. According to one or more embodiments, the MSNs are MCM-41 (available from Mobil Corp) with encapsulated CTAB. Alternatively, MSNs with an encapsulated surfactant may be prepared according to methods known in the art. In summary, CTAB may be dissolved in deionized water. Then, a solution of NaOH may be added to the CTAB solution and the temperature raised to 80° C. After that, 5 ml of tetraethylorthosilicate (TEOS) may be added dropwise and the mixture stirred vigorously for one hour. The resultant MSNs may be filtered and washed with deionized water. Alternatively, the reaction media containing the MSNs may be used in subsequent steps for forming the stabilized MSNs.

In one or more embodiments, the method of forming the stabilized MSNs may include providing a suspension of the MSNs. The suspension of MSNs may also be provided as is, as the reaction medium from the synthesis of the MSNs. The MSNs in the suspension may be provided in an amount ranging from 1 wt % to 50 wt % based on a total weight of the suspension. The suspension may may therefore include the MSNs suspended in an aqueous medium of either deionized water or a water solution containing single or mixed salts.

The suspension including the MSNs may be contacted with a solution that includes the component that will surface modify the MSNs. According to one or more embodiments, the second solution may include the GLYMO in its ring-opened form. The ring-opened GLYMO may be provided by treating the GLYMO with a ring-opening agent that is capable of reacting with the glycidyl ether group. In one or more embodiments, the GLYMO may be ring-opened via an acid catalyst ring opening reaction that takes place in the presence of hydrochloric acid. The same solution used to form the ring-opened GLYMO may be used to react with the suspension of the MSNs. The concentration of the aqueous GLYMO solution required to functionalize the MSNs may be in a range of about 9 to 10 μmol/mL. In particular embodiments, the concentration may be about 9.2 μmol/mL. Higher concentrations of the GLYMO promote gelling of the composition while lower concentrations do not provide adequate stability of the MSNs.

The suspension of MSNs and the solution may be contacted at a temperature ranging from 40 to 80° C. According to one or more embodiments, the contacting may be performed at a temperature of about 80° C. The suspension of MSNs and the solution may also be contacted at a basic pH to ensure the deprotonation of all hydroxyl groups. According to one or more embodiments, the pH may range from 8 to 11. Adding the suspension of MSNs and the GLYMO solution at the required pH and temperature results in a condensation reaction that takes place between the hydroxy groups of the MSNs and the siloxy groups of the GLYMO. Thus, the condensation reaction forms surface modified MSNs that include the encapsulated surfactant and GLYMO as the MSNs surface functionality. The formed surface modified MSNs may then be filtered and washed repeatedly with water to remove unreacted species. The filtered MSNs may then be dried.

Since the GLYMO functionalized MSNs are not colloidally stable, adding a zwitterionic surfactant results in the stability of the particles. As such, the method may further include contacting the surface modified MSNs with a zwitterionic surfactant solution to form stabilized MSNs. The formation of the stabilized MSNs may also include sonicating the surface modified MSNs in the zwitterionic surfactant solution at a temperature of 40° C.-80° C. for 20 minutes to 1 hour.

The zwitterionic surfactant solution includes a zwitterionic surfactant. The zwitterionic surfactant may be a betaine such as a sulfobetaine or a sultaine. According to one or more embodiments, the zwitterionic surfactant may be cocamidopropyl hydroxysultaine, such as the commercially available Cola® Teric CBS. The zwitterionic surfactant concentration in the zwitterionic surfactant solution may range from 0.01 to 1 g/mL. According to one or more embodiments, the zwitterionic surfactant and the MSNs may be provided in amounts to satisfy a concentration ratio of about 100.

To evaluate the stability of the stabilized MSNs, the stabilized MSNs may be formed using a testing solution. With a testing solution, the zwitterionic surfactant solution may be provided in high salinity water comprised of monovalent and/or divalent salts to form a high salinity zwitterionic surfactant solution. The salts within the high salinity zwitterionic surfactant solution may be present at a total concentration of at least 10 g/L to 100 g/L. According to one or more embodiments, the salt concentration of the high salinity zwitterionic surfactant solution may include any amount to reflect salt concentrations of a formation water and high salinity reservoirs. The monovalent and/or divalent salts include but are not limited to sodium salts (NaCl, $Na_2SO_4$ and $NaHCO_3$), calcium salts ($CaCl_2$) and magnesium salts ($MaCl_2$). In one or more embodiments, the high salinity water includes 41.04 g/L NaCl, 2.4 g/L $CaCl_2$, 17.65 g/L $MgCl_2$, 6.3 g/L $Na_2SO_4$, 0.165 g/L $NaHCO_3$. The high salinity water may therefore be a separately prepared as a stock solution and combined with the zwitterionic surfactant to form the high salinity zwitterionic surfactant solution with the required concentrations noted above.

The formation of the stabilized MSNs may be confirmed via DLS data. The introduction of the zwitterionic surfactant at sufficient concentrations aids in the formation of stabilized MSNs with a larger size compared to MSNs that are not stabilized. According to one or more embodiments, through contacting the surface modified MSNs with the zwitterionic surfactant, the stabilized MSNs result in a diameter ranging from 5 nm to 500 nm). As a non-limiting example, before stabilization, the average diameter of the MSNs may be 50-100 nm. After stabilization, the size of the MSNs may be reduced to about 10 nm. The size of the final stabilized MSNs may therefore range from 5 nm to 500 nm. This range of sizes allows for the stabilized MSNs to maintain their stability for extended periods of time even at high temperature.

Wellbore Fluid Composition

In another aspect, embodiments of the present disclosure include a wellbore fluid composition that includes the stabilized MSNs described above which include an encapsulated surfactant and 3-glycidyloxypropyl)trimethoxysilane (GLYMO) as a surface functionality and wherein the mesoporous materials are formed by treating the stabilized mesoporous materials with a zwitterionic surfactant. The wellbore fluid composition may include the MSNs suspended in an aqueous base fluid.

As described above, in the wellbore fluid composition of one or more embodiments, the MSNs are suspended in an aqueous base fluid. Suitable aqueous base fluids include, for example, water-based wellbore fluids, such as water-based drilling muds (WBMs), or completion fluids, among others. However, the MSNs may also be modified for use in organic base fluids.

The wellbore fluid composition of one or more embodiments includes the MSNs in an amount ranging from about 0.2 to 10 percent by weight (wt. %) based on the total weight of the wellbore fluid composition. For example, the wellbore fluid composition may contain the MSNs in an amount ranging from a lower limit of any of 0.2, 0.3, 0.5, 0.7, 0.8, 1.0, 1.5, 2.0, and 2.5 wt. % to an upper limit of any of 0.5, 1.0, 1.5, 2.0, 2.5, 5.0, 7.5, and 10.0 wt. %, where any lower limit can be used in combination with any mathematically-compatible upper limit.

Further, other additives may be included in the wellbore fluid compositions of the present disclosure. Such additives may include, for instance, one or more of the groups consisting of weighting agents, viscosifiers, wetting agents, corrosion inhibitors, oxygen scavengers, anti-oxidants, biocides, surfactants, dispersants, interfacial tension reducers, pH buffers, mutual solvents and thinning agents. The wellbore fluid compositions of one or more embodiments may have a pH range from about 2 to about 10. Weighting agents suitable for use in the wellbore fluid compositions of one or more embodiments include, for example, bentonite, barite, dolomite, calcite, and the like. The identities and use of the aforementioned additives are not particularly limited. One of ordinary skill in the art will, with the benefit of this disclosure, appreciate that the inclusion of a particular additive will depend upon the desired application, and properties, of a given wellbore fluid composition.

The rheological properties of a wellbore fluid composition are important in determining the suitability of the fluid for a given application.

The plastic viscosity of a fluid is a measure of the resistance of the fluid to flow. For instance, drilling fluids that have a lower plastic viscosity have the capacity to drill more quickly. Plastic viscosity is dependent on both the solid content of a fluid and temperature. The wellbore fluid composition of one or more embodiments may have a plastic viscosity ranging from about 3.0 to 6.0 cP at room temperature. As used herein, "room temperature" refers to the temperature of the ambient environment. Generally, room temperature may be considered to be about 23° C. but may range from about 20° C. to about 28° C. The viscosity measurements described as being conducted at room temperature were conducted at about 23° C. For example, the wellbore fluid composition may have a plastic viscosity that ranges from a lower limit of any of 3.0, 3.5, 4.0, and 4.5 cP to an upper limit of any of 4.0, 4.5, 5.0, 5.5, and 6.0 cP, where any lower limit can be used in combination with any mathematically compatible upper limit.

The wellbore fluid composition of one or more embodiments may have an initial gel strength, such as a gel strength measured after 10 seconds, ranging from about 1.0 to 5.0 lb/100 ft$^2$ (pounds per 100 square feet). For example, the wellbore fluid composition may have an initial gel strength that ranges from a lower limit of any of 1.0, 1.5, 2.0, and 2.5 lb/100 ft$^2$ to an upper limit of any of 3.0, 3.5, 4.0, 4.5, and 5.0 lb/100 ft$^2$, where any lower limit can be used in combination with any mathematically compatible upper limit.

The wellbore fluid composition of one or more embodiments may have a final gel strength, such as a gel strength measured after 10 minutes, ranging from about 1 to 5 lb/100 ft$^2$. For example, the wellbore fluid composition may have a final gel strength that ranges from a lower limit of any of 1.0, 1.5, 2.0, and 2.5 lb/100 ft$^2$ to an upper limit of any of 3.0, 3.5, 4.0, 4.5, and 5.0 lb/100 ft$^2$, where any lower limit can be used in combination with any mathematically compatible upper limit.

The yield point is the resistance of a fluid to initiate movement and is an assessment of the strength of the attractive forces between the colloidal particles of the fluid. The yield point, for instance, demonstrates the capability of a drilling fluid to raise shale cuttings out of a borehole under dynamic conditions. A fluid with a higher yield point provides better carrying capacity as compared to a fluid with similar density and lower yield point. The wellbore fluid composition of one or more embodiments may have a yield point ranging from about 5 to 15 lb/100 ft$^2$. For example, the wellbore fluid composition may have a plastic viscosity that ranges from a lower limit of any of 5.0, 6.0, 7.0, 8.0, 9.0 and 10 lb/100 ft$^2$ to an upper limit of any of 10, 11, 12, 13, 14, and 15 lb/100 ft$^2$, where any lower limit can be used in combination with any mathematically compatible upper limit.

Wellbore fluid compositions in accordance with the present disclosure may be used as one or more of a drilling or drill-in fluid during the drilling of a wellbore, as a completion fluid for the completion of a wellbore after drilling is completed, and a workover fluid that is used for well workover.

Method for Treating Formations

In another aspect, embodiments disclosed herein relate to a method that includes introducing into a hydrocarbon-bearing formation a wellbore fluid composition comprising an aqueous base fluid and stabilized mesoporous particles, wherein the mesoporous materials comprise an encapsulated cationic surfactant and 3-glycidyloxypropyl)trimethoxysilane (GLYMO) as a surface functionality, wherein the stabilized mesoporous materials are formed by treating the mesoporous materials with a zwitterionic surfactant, displacing a hydrocarbons from the hydrocarbon-bearing formation by contacting the hydrocarbons with the wellbore fluid composition, and recovering the hydrocarbons from the hydrocarbon-bearing formation.

The wellbore fluid composition as outlined above may be used for treating a hydrocarbon-bearing formation in EOR operations. In some embodiments, a wellbore fluid composition may be injected into the hydrocarbon-bearing formation at an injection well, driven through the mobile zone of the formation, displacing hydrocarbons and increasing the hydrocarbon-saturation of the oil bank. In one or more embodiments the hydrocarbons may be recovered at a production well.

In enhanced oil recovery applications, the wellbore fluid compositions disclosed herein may be exceptionally stable under reservoir conditions such as high temperature and high salinity, which may lead to improved oil recovery. Additionally, due to the unique encapsulation of the cationic surfactant inside the porous particle, which is further stabilized by the GLYMO and the zwitterionic surfactant, the cationic surfactant may be slowly released into the hydrocarbon-bearing formation during enhanced oil recovery operations. This stabilized and encapsulation strategy may be advantageous as compared to conventional methods of introducing surfactants into a hydrocarbon-bearing formation. In conventional methods, much of the surfactant may adsorb onto surfaces near the wellbore area leading to less surfactant penetrating deeper into the formation where enhanced oil recovery is needed.

Embodiments of the present disclosure may provide at least one of the following advantages: stabilizing mesoporous particles under conditions representative of subsurface environments thereby providing porous, slowly release surfactants that are colloidally stable. The embodiments also provide materials suitable for direct upstream applications that range from drilling fluids to enhancing foam stability.

EXAMPLES

Example 1

Synthesis of the mesoporous material MCM-41 was performed by known methods. In summary, 1 g of cetyltrimethylammonium bromide (CTAB) was dissolved in 480 ml deionized water. Then, 3.5 ml of 2 M NaOH was added to the solution and the temperature is raised to 80° C. After that, 5 ml of tetraethylorthosilicate (TEOS) was added dropwise and the mixture was stirred vigorously for one hour.

(2) 250 mL of the resultant material was withdrawn, washed several times with deionized water (DI) and filtered using 0.4 um filter paper. The remaining was kept in the reaction vessel stirring at 80° C.

(3) GLYMO went through an acid-catalyzed ring opening reaction as described previously. In summary, 0.51 mL of stock GLYMO was mixed with 3.66 mL of 0.01 M HCl under stirring for 5 minutes.

Figure 1:
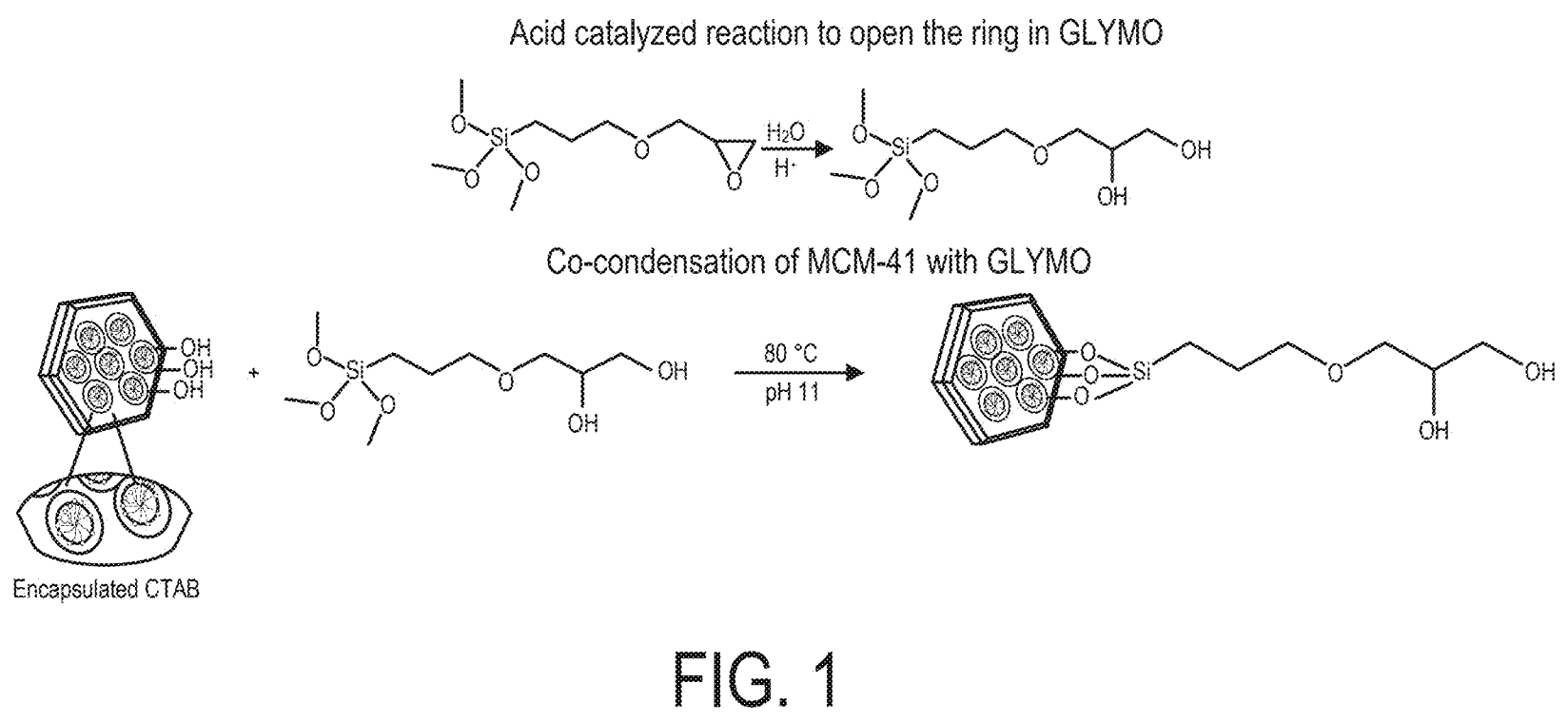

The solution from (3) was added dropwise to the remaining suspension of (1) and kept stirring overnight. The resultant MCM-41-GLYMO was filtered through 0.4 um filter paper and washed several times with Deionized (DI) water to remove unreacted species. It was then dried at 50° C. overnight. The proposed reaction scheme is shown in FIG. 1.

As shown in FIG. 2, the MCM-41-GLYMO contains about 37 wt % of organic content which is indicated by the weight drop from 128° C. to 362° C.

Example 2

The MCM-41-GLYMO from Example 1 was treated with a zwitterionic surfactant. The zwitterionic surfactant utilized was Cocamidopropyl Hydroxysultaine (Cola® Teric CBS). High salinity water (HSW) that contains 56 g/L of monovalent and divalent ions was used for the colloidal stability experiments. The composition of the HSW is as follow: 41.04 g/L NaCl, 2.4 g/L CaCl$_2$, 17.65 g/L MgCl$_2$, 6.3 g/L Na$_2$SO$_4$, 0.165 g/L NaHCO$_3$.

A stock solution of 1 mg/mL of MCM-41 GLYMO was prepared and probe sonicated for 20 minutes at 30 Watt. A stock solution of CBS of 0.1 and 0.05 g/mL of CBS was prepared in the HSW.

Figure 3:
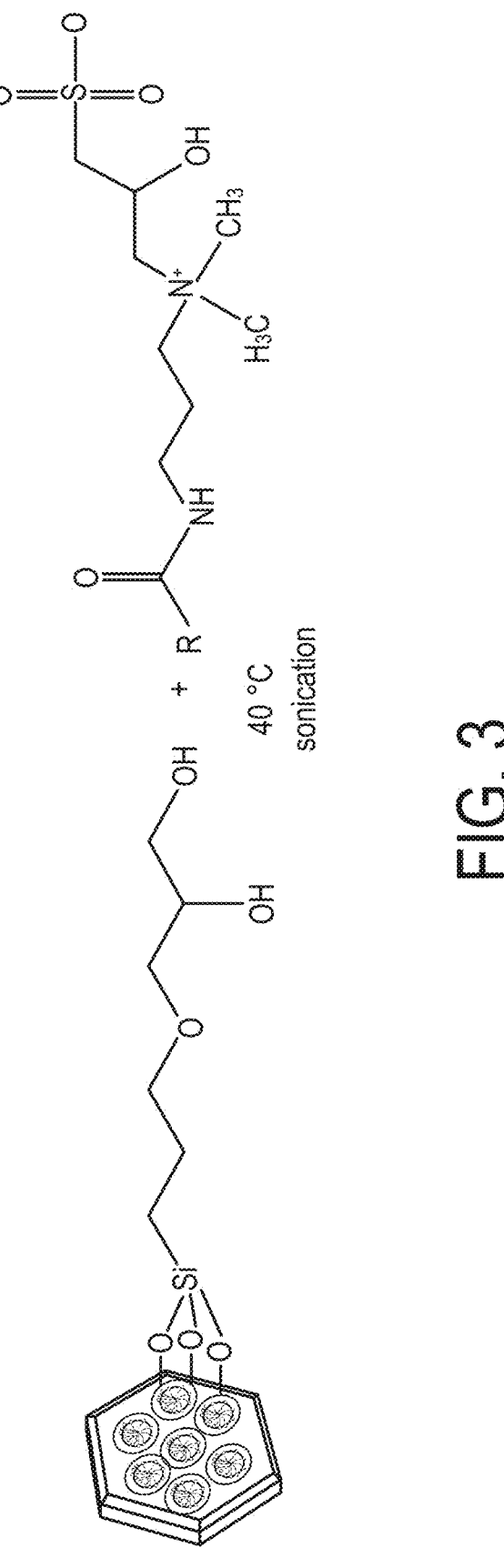
FIG. 3 is a reaction scheme according to Example 2.

10 mL of the MCM-41 GLYMO solution was transferred to a 20 mL vial. Then varying concentration of the zwitterionic surfactant were used with the final concentration of MCM-41-GLYMO was kept 0.5 mg/mL. The formed compositions are shown in Table 1 below. The MCM-41-GLYMO-CBS suspension was sonicated for 20 minutes at 40° C. The reaction scheme is shown in FIG. 3. The colloidal stability of the various compositions was then monitored visually and with Dynamic Light Scattering.

TABLE 1

| sample | MCM-41-glymo (mg/mL) | MCM-41 (mg/mL) | CBS (mg/mL) |
|---|---|---|---|
| A | 0.5 | | 12.5 |
| B | 0.5 | | 25 |
| C | 0.5 | | 0 |
| D | 0.5 | | 50 |
| E | 0.5 | | 40 |
| F | 0.5 | | 0 |
| G | — | 0.5 | 50 |

Table 2 indicates the observed properties of the different samples with no CBS (samples C&F), MCM-41-GLYMO-CBS (Samples A, B, D, E) and MCM-41-CBS only (G). It was concluded that the suspension in samples C & F phase separated and generated visible particles that indicated poor stability of the MCM-41-GLYMO in HSW.

TABLE 2

| Sample | Time point | | | | | | | | |
|---|---|---|---|---|---|---|---|---|---|
| | 0 hr | 1 hr | 5 hr | 24 h | 48 h | 120 h | 144 h | 168 h | 264 h |
| A | CLO | CLO | CLO | CLO | CLOVP | | | | |
| B | CLO | CLO | CLO | CLO | CLOVP | | | | |
| C | VP | VP | VP | VP | VP | | | | |
| D | CLO | | | CLO | | CLO | CLO | CLO | CLO |
| E | CLO | | | CLO | | CLO | CLO | CLO | CLO |
| F | CLOVP | | | VP | | VP | VP | VP | VP |
| G | CLO | | | VP | | VP | VP | VP | VP |

CLO-Cloudy, VP-visible particles from phase separation

In contrast, samples A and B remained colloidally stable for 2 days, after which they have phase separated. By increasing the concentration of CBS, the system became dispersed and stable in HSW as shown for samples D&E. These results indicate that when either CBS or GLYMO are used, they do not stabilize MCM-41. However, the combination of CBS and GLYMO makes the suspension stable.

Figure 4:
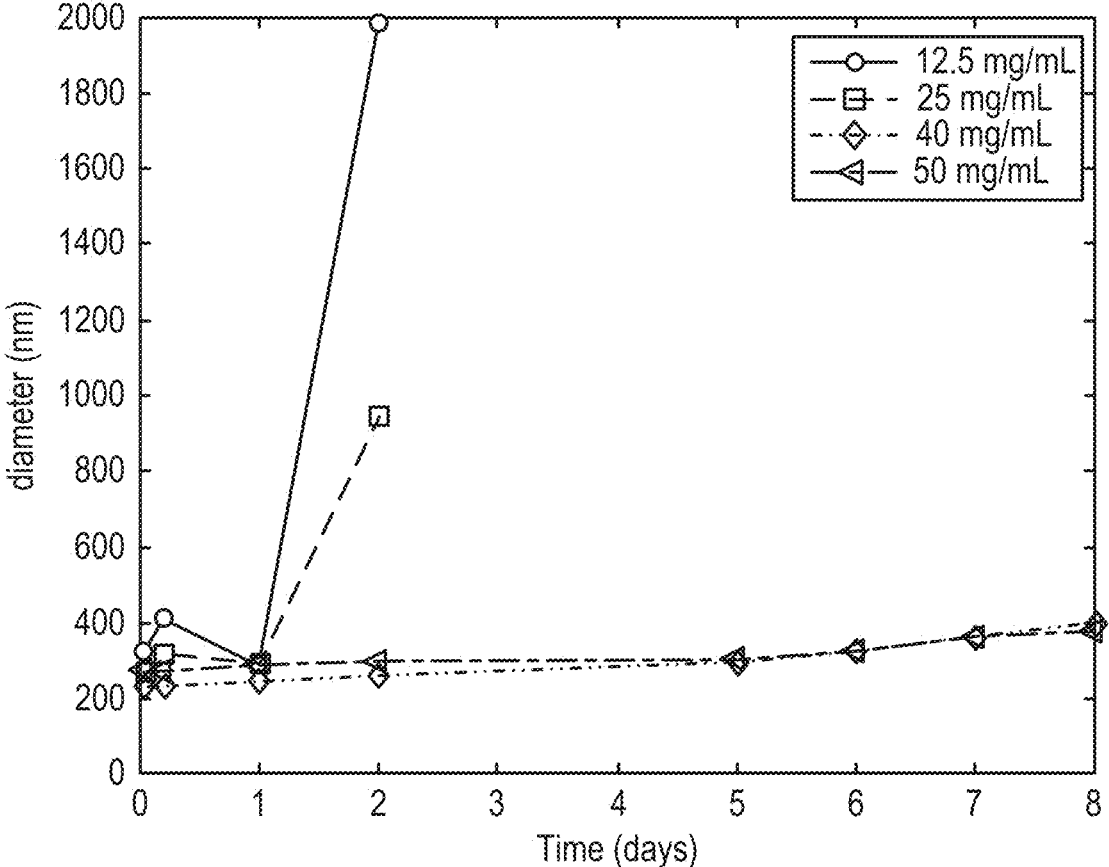
FIG. 4 shows dynamic light scattering (DLS) data according to Example 2.

The DLS data as shown in FIG. 4 confirms the visual inspection in which samples A&B aggregated to larger size particles and phase separated. In contrast, samples E&D maintained their size/stability for an extended period of time for this study, 11 days.

The colloidal stability is also confirmed by accelerated centrifugation technique utilizing LUMiSizer®. The Multiwavelength LUMiSizer® is technique based on measuring the transmittance of a sample at all positions of the samples' cell. The changes on the transmission of the samples can then be translated into several functions such as size of dispersion, stability index, sedimentation velocity, creaming velocity, sedimentation and creaming height. The instrument can operate with an acceleration up to 2300 times the gravitational acceleration and from 4° C. to 60° C. This can provide a reliable and fast analysis of up to 12 samples simultaneously. Polyamide (PA) cells rectangular cells were utilized in this study. About 3.6 mL of the samples of interest were used in the cell. The experiments were run at 1000 rpm and a 100 space-transmission profiles were collected in 16 minutes.

Figure 5:
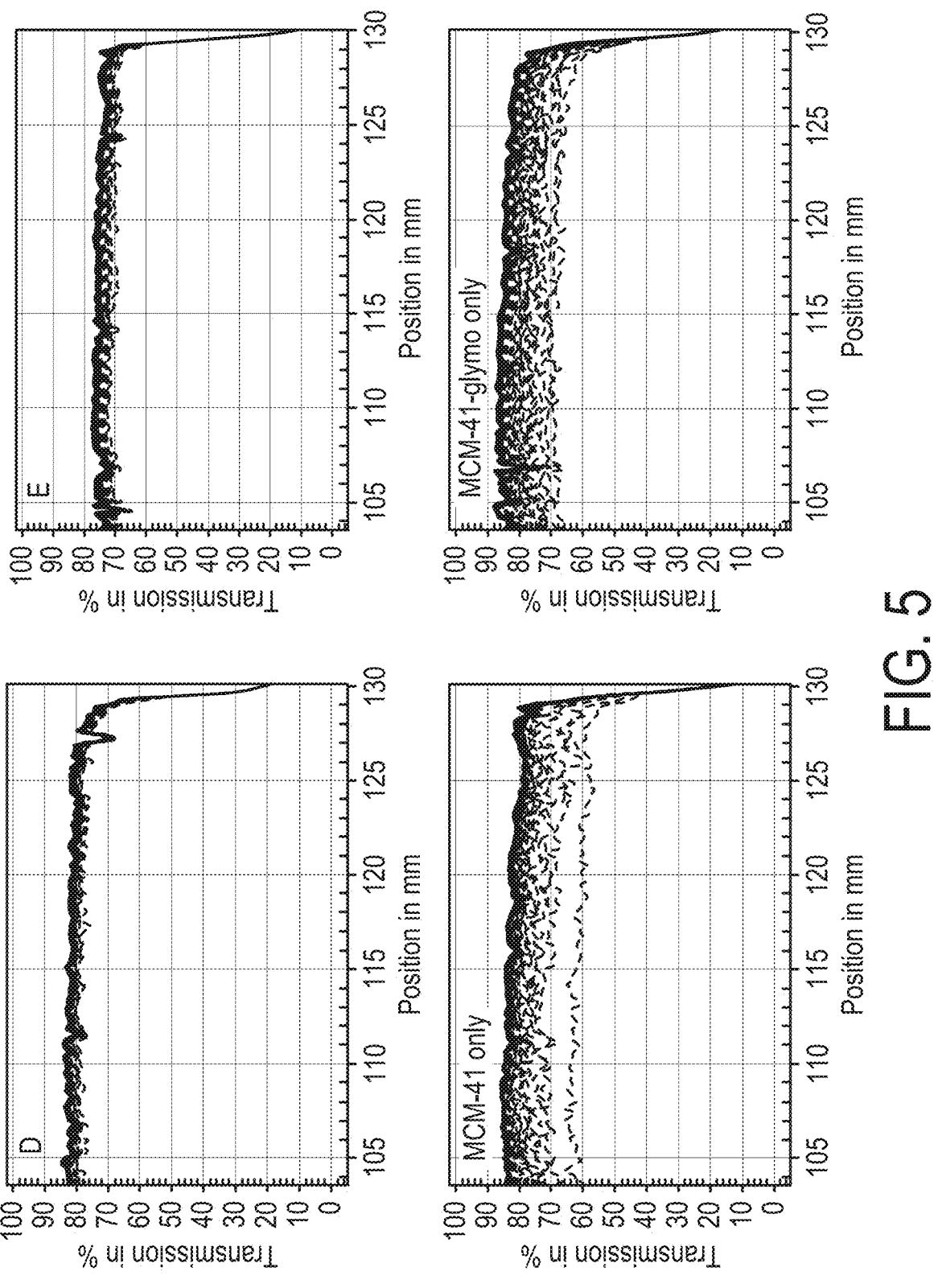
FIG. 5 shows transmission data according to Example 2.

As can be seen in FIG. 5, samples D and E have very minimal changes in their transmittance despite being subjected to 1000 rpm. However, MCM-41 and MCM-41 with GLYMO only had significant changes in the transmittance due to instability and sedimentation.

Figure 6:
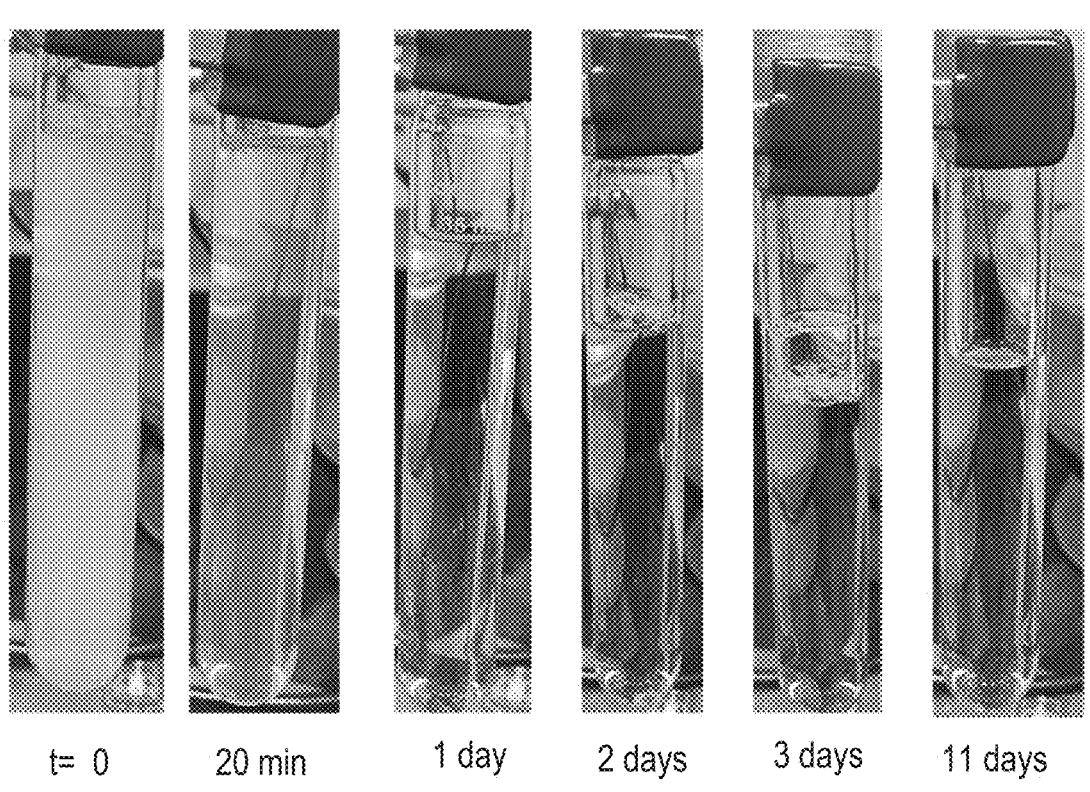
FIG. 6 depicts high-temperature stability data according to Example 2.

Sample D was further evaluated for colloidal stability at 90° C., as shown in FIG. 6, the sample started turbid and cloudy. After 20 minutes of incubation, the turbidity reduced. In one day, the sample became well-dispersed and no turbidity was observed. The sample was stable for more than 30 days at the tested conditions with data shown up to 11 days.

Figure 7:
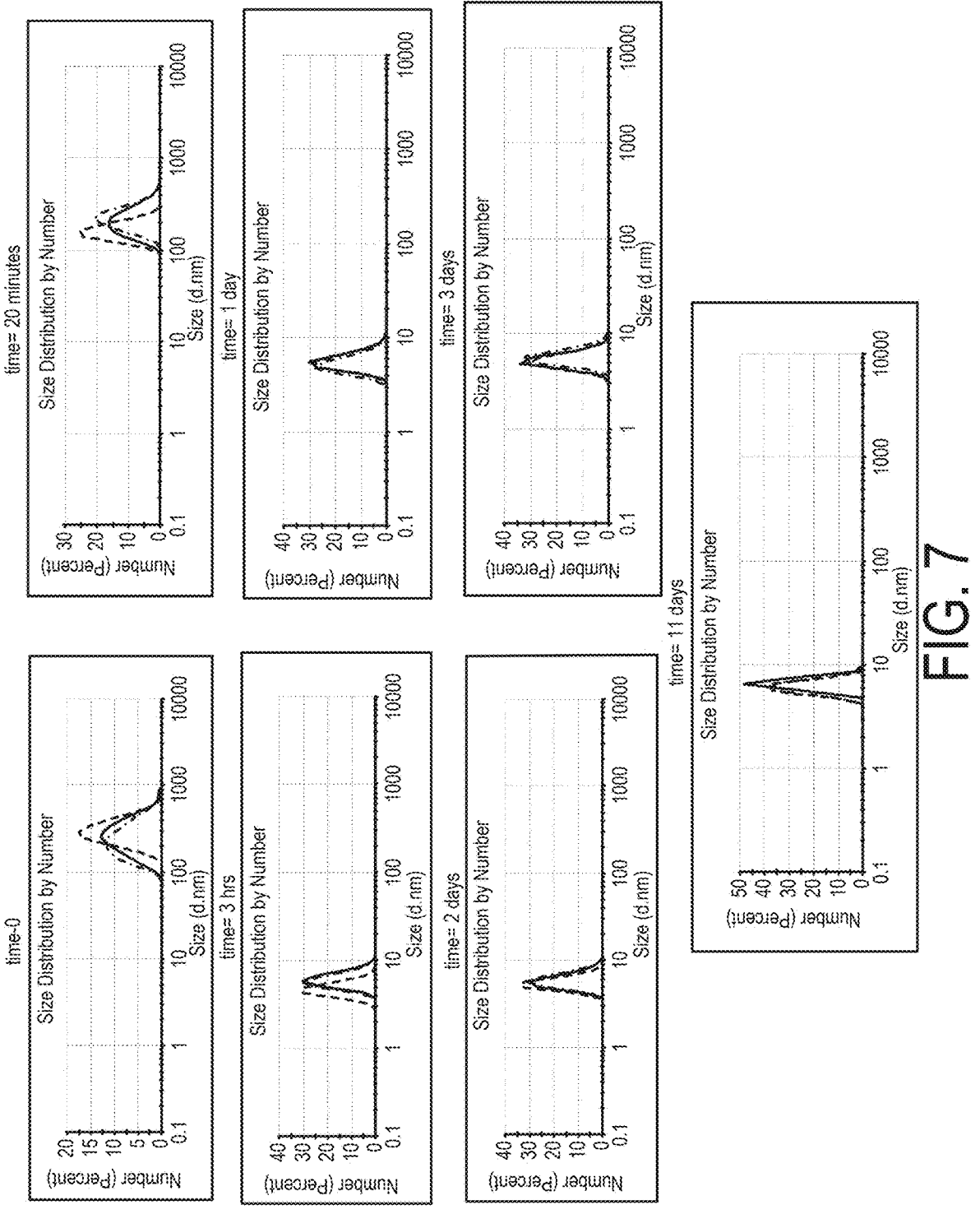
FIG. 7 shows time-dependent DLS data for sample D at high temperatures according to Example 2.

The data in FIG. 7 shows that one reason for the sample to become clearer with time is the fact that the size of the particles reduced. When they were initially synthesized, the diameter was about 250-300 nm. After incubation in the oven at 90° C., the size reduced to about 100 nm in 20 minutes and then to less than 10 nm as revealed by the DLS.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A method for stabilizing mesoporous materials comprising:
  providing a suspension comprising a mesoporous particle, wherein the mesoporous particle comprises an encapsulated surfactant;
  contacting the suspension with a solution comprising ring-opened 3-(glycidyloxypropyl)trimethoxysilane (GLYMO) at a temperature ranging from 40 to 80° C. and at a pH ranging from 8 to 11 to form a surface modified mesoporous particle; and
  contacting the surface modified mesoporous particle with a zwitterionic surfactant solution to form a stabilized mesoporous material.

2. The method of claim 1, wherein the contacting the surface modified mesoporous particle with a zwitterionic surfactant solution comprises:
  sonicating at a temperature of 40° C.-80° C. for 20 minutes to 1 hour.

3. The method of claim 1, wherein the zwitterionic surfactant solution comprises:
  a zwitterionic surfactant present at a concentration ranging from 0.01 g/mL to 1 g/mL.

4. The method of claim 1, wherein the encapsulated surfactant is a cationic or anionic surfactant.

5. The method of claim 4, wherein the cationic surfactant is selected from the group consisting of cetyltrimethylammonium bromide, cetyltrimethylammonium chloride, octadecyltrimethylammonium chloride, hexadecylpyridinium bromide, didodecyldimethylammonium bromide, dioctadecyldimethylammonium bromide, and N,N-dimethyl-N-octadecyl-N-benzylammonium chloride.

6. The method of claim 1, wherein the stabilized mesoporous materials have an average particle diameter ranging from 5 nm to 500 nm.

7. The method of claim 1, wherein the mesoporous particle is MCM-41.

8. The method of claim 1, wherein the zwitterionic surfactant solution comprises cocamidopropyl hydroxysultaine.

9. The method of claim 1, wherein the solution comprising the ring-opened GLYMO includes GLYMO at a concentration ranges from 9 to 10 μmol/mL.

10. A wellbore fluid composition comprising:
  an aqueous base fluid, and mesoporous materials comprising an encapsulated surfactant and 3-(glycidyloxypropyl)trimethoxysilane (GLYMO) as a surface functionality;
  wherein the mesoporous materials are formed by treating the mesoporous materials with a zwitterionic surfactant.

11. The wellbore fluid composition of claim 10, wherein the encapsulated surfactant is a cationic surfactant or an anionic surfactant.

12. The wellbore fluid composition of claim 11, wherein the cationic surfactant selected from the group consisting of cetyltrimethylammonium bromide, cetyltrimethylammonium chloride, octadecyltrimethylammonium chloride, hexadecylpyridinium bromide, didodecyldimethylammonium bromide, dioctadecyldimethylammonium bromide, and N,N-dimethyl-N-octadecyl-N-benzylammonium chloride.

13. The wellbore fluid composition of claim 10, wherein the zwitterionic surfactant is cocamidopropyl hydroxysultaine.

14. The wellbore fluid composition of claim 10, wherein the mesoporous materials have an average particle diameter ranging from 5 nm to 500 nm.

15. The wellbore fluid composition of claim 10, wherein the mesoporous material is MCM-41.

16. A method for treating a hydrocarbon-bearing formation comprising:
  introducing into a hydrocarbon-bearing formation a wellbore fluid composition comprising an aqueous base fluid and mesoporous materials, wherein the mesoporous materials comprise an encapsulated cationic surfactant and 3-(glycidyloxypropyl)trimethoxysilane (GLYMO) as a surface functionality;
  displacing hydrocarbons from the hydrocarbon-bearing formation by contacting the hydrocarbons with the wellbore fluid composition; and
  recovering the hydrocarbons from the hydrocarbon-bearing formation,
  wherein the mesoporous materials are formed by treating the mesoporous materials with a zwitterionic surfactant.

17. The method of claim 16, wherein the mesoporous material is MCM-41 surface-functionalized by GLYMO.

18. The method of claim 16, wherein the mesoporous materials have an average particle diameter ranging from 5 nm to 500 nm.

19. The method of claim 16, wherein the zwitterionic surfactant is cocamidopropyl hydroxysultaine.

20. The method of claim 16, wherein the encapsulated surfactant is a cationic or anionic surfactant, wherein the cationic surfactant is selected from the group consisting of cetyltrimethylammonium bromide, cetyltrimethylammonium chloride, octadecyltrimethylammonium chloride, hexadecylpyridinium bromide, didodecyldimethylammonium bromide, dioctadecyldimethylammonium bromide, and N,N-dimethyl-N-octadecyl-N-benzylammonium chloride; and the anionic surfactant is selected from the group consisting of sodium dodecyl sulfate, sodium lauryl sulfate, and dioctyl sulfosuccinate sodium.

* * * * *